United States Patent [19]
Nakai

[11] Patent Number: 5,142,625
[45] Date of Patent: Aug. 25, 1992

[54] ONE-CHIP MICROCOMPUTER INCLUDING A PROGRAMMABLE LOGIC ARRAY FOR INTERRUPT CONTROL

[75] Inventor: Masaaki Nakai, Kawachinagano, Japan

[73] Assignee: Minolta Camera Kabushiki Kaisha, Osaka, Japan

[21] Appl. No.: 298,223

[22] Filed: Jan. 13, 1989

Related U.S. Application Data

[63] Continuation of Ser. No. 185,365, Apr. 21, 1988, abandoned, which is a continuation of Ser. No. 872,658, Jun. 10, 1986, abandoned.

[30] Foreign Application Priority Data

| Jun. 12, 1985 | [JP] | Japan | 60-127808 |
| Aug. 6, 1985 | [JP] | Japan | 60-173484 |
| Aug. 6, 1985 | [JP] | Japan | 60-173485 |
| Aug. 6, 1985 | [JP] | Japan | 60-173486 |
| Aug. 6, 1985 | [JP] | Japan | 60-173487 |

[51] Int. Cl.⁵ .......................................... G06F 13/14
[52] U.S. Cl. ................................ 395/275; 364/DIG. 1;
    364/DIG. 2; 364/925.6; 364/926.93;
    364/232.8; 364/238.3
[58] Field of Search ... 364/200 MS File, 900 MS File;
    395/DIG. 1, DIG. 2, 275, 800

[56] References Cited

U.S. PATENT DOCUMENTS

| 4,074,355 | 2/1978 | Tubbs | 364/200 |
| 4,195,352 | 3/1980 | Tu et al. | 364/200 |
| 4,381,552 | 4/1983 | Nocilini et al. | 364/900 |
| 4,438,492 | 3/1984 | Harmon, Jr. et al. | 364/200 |
| 4,455,623 | 6/1984 | Wesemeyer et al. | 364/900 |
| 4,571,675 | 2/1986 | Stambaugh et al. | 364/200 |
| 4,580,216 | 4/1986 | Bellay et al. | 364/200 |
| 4,591,975 | 5/1986 | Wade et al. | 364/200 |
| 4,631,665 | 12/1986 | Yokouchi | 364/200 |
| 4,646,232 | 2/1987 | Chang et al. | 364/200 |
| 4,665,495 | 5/1987 | Thaden | 364/900 |
| 4,674,089 | 6/1987 | Poret et al. | 364/200 |
| 4,713,750 | 12/1987 | Damouny et al. | 364/200 |

OTHER PUBLICATIONS

"Single-Chip Microcomputer Data", 2nd ed., Austin, Texas, Motorola Inc., 1984, pp. (3-599)-(3-622).
"8-Bit Microprocessor & Peripheral Data", Series C, Austin, Texas, Motorola Inc., 1983, pp. (3-372).
"PAL Handbook", Sunnyvale, CA., Monolithic Memories, 1978, pp. (1-3).
IC5850 Series (LC5850, LC5851) User's Manual.

Primary Examiner—Thomas C. Lee
Assistant Examiner—Robert B. Harrell
Attorney, Agent, or Firm—Burns, Doane, Swecker & Mathis

[57] ABSTRACT

In a one-chip microcomputer, a programmable logic array is interposed between an input/output port and a central processing unit and processes the signals input to the input/output port in accordance with a given program such that the interrupt operation in the microcomputer is controlled by the output of the programmable logic array in response to the signals input to the input/output port. A part of the input/output port may be used as the interrupt terminals, and additionally the control of outer circuits outside of the microcomputer is carried out, independently of the program of the microcomputer, by the output of the programmable logic array in response to the signals input to the input/output port.

6 Claims, 6 Drawing Sheets

ONE-CHIP MICROCOMPUTER INCLUDING A PROGRAMMABLE LOGIC ARRAY FOR INTERRUPT CONTROL

This application is a continuation of application Ser. No. 185,365, filed Apr. 21, 1988 which is a continuation of application Ser. No. 872,658 filed Jun. 10, 1986, both of which are abandoned.

BACKGROUND OF THE INVENTION

1. Field of the Invention

The present invention relates to a microcomputer in which an input unit, an output unit, a central processing unit and a memory unit are incorporated in a single chip, i.e. one-chip microcomputer and more particularly pertains to a general-purpose one-chip microcomputer which can be adapted for various requirements of the users who purchase the microcomputer, incorporate it in their product and manufacture and sell the product.

2. Description of the Prior Art

The input/output (I/O) terminals of conventional general-purpose one-chip microcomputers can be optionally specified as to the type of output terminal and can be determined to one of (1) N-channel, (2) P-channel and (3) C-MOS at the masking stage in the process of producing the microcomputer. However, in such conventional microcomputers, only a few terminals are provided as interrupt terminals. Hence, in the case when more than a few interrupt terminals were required, gate circuits were provided outside of the microcomputer, or a custom-made microcomputer designed for the particular purpose to have a desired number of interrupt terminals had to be employed.

When a custom-made microcomputer is employed, its unit price is high and this increases the price of the product including the microcomputer since the manufacture of the microcomputer can not expect mass production effect from the custom-made microcomputer. When the gate circuit is provided outside of the microcomputer, the cost of the outer circuit will also increase.

Additionally, there has been no general-purpose microcomputer in which, besides the number of interrupt terminals, the polarity of interrupt at each interrupt terminal can be specified or in which the interrupt terminal can be masked.

OBJECTS AND SUMMARY OF THE INVENTION

An object of the present invention is to provide a general-purpose one-chip microcomputer which can be adapted for various requirement of the user.

Another object of the present invention is to provide a one-chip microcomputer which can be adapted with a simple circuit construction, for various requirements such as increase of the number of interrupt terminals and specification of the polarity of each interrupt terminal.

In one embodiment of the present invention, a programmable logic array (hereinafter referred to as PLA) is interposed between the I/O port and a central processing unit or central processor (hereinafter referred to as CPU) such that the interruption operation is controlled by the output of the PLA in response to the signals from the I/O port and that a part of the I/O terminals may be used as the interrupt terminals.

According to the present invention, a PLA is provided in the I/O port section to control the interruption operation by the output of the PLA and a part of the I/O terminals are used as the interrupt terminals. Hence, microcomputer makers need only modify the PLA to flexibly comply with the incorporation of the microcomputer into various products, and may supply the microcomputers in conventional form to ordinary users. Further, the portion to be added for the purpose of the present invention is simple in construction so that the increase of cost is small. The users can use general-purpose microcomputers for their specific purposes in the forms meeting to their requirements with only little addition to the outer circuit. The microcomputer itself can be obtained at a low cost because it is designed for general-purpose and can be made by mass production.

Other objects and advantages of the invention will become apparent from the following discussion of the accompanying drawings.

DETAILED DESCRIPTION OF THE PREFERRED EMBODIMENTS

Figure 1:
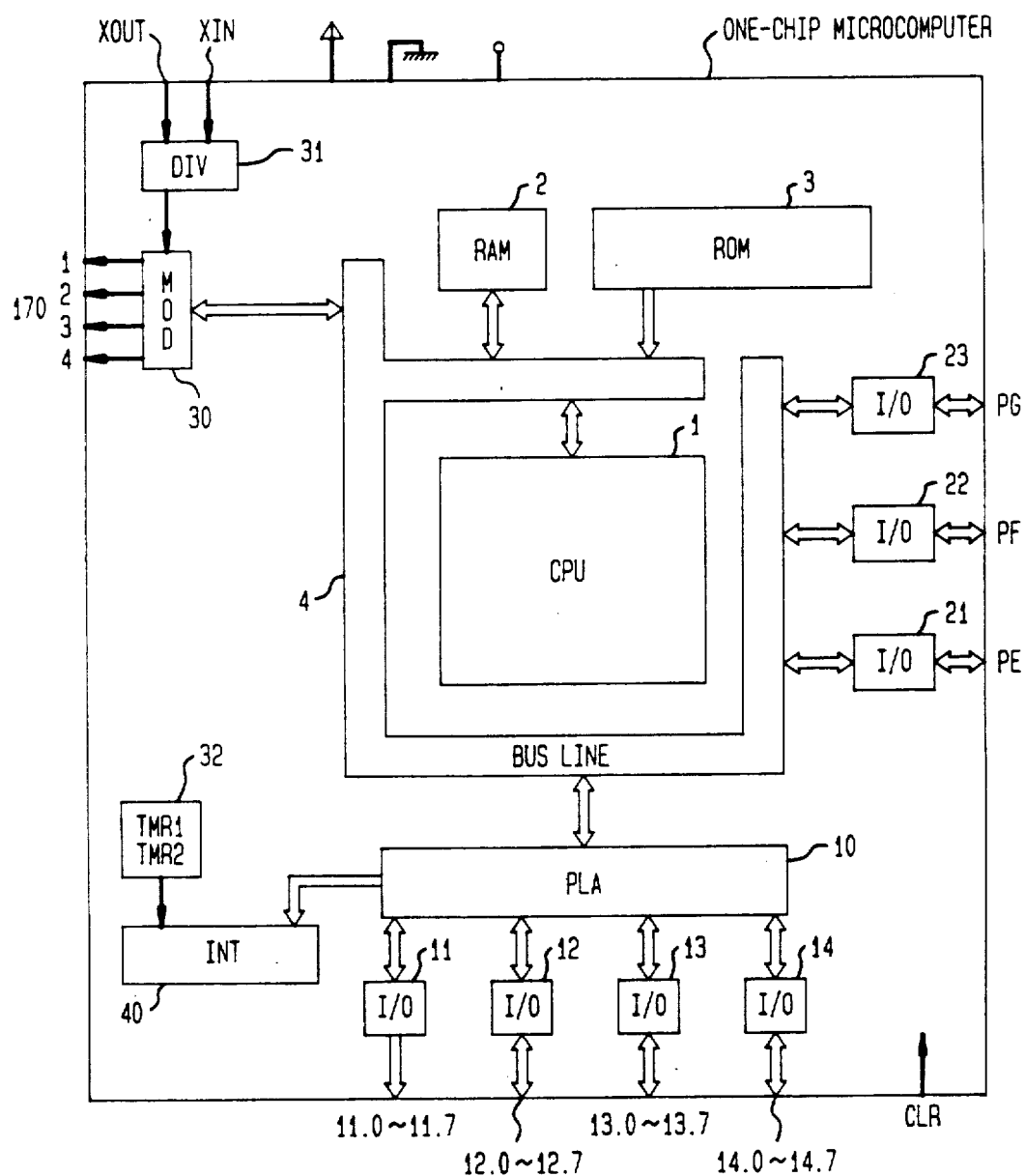
FIG. 1 is a block diagram showing the general construction of an embodiment of the present invention.

FIG. 1 is a block diagram showing a general construction of an embodiment of a one-chip microcomputer according to the present invention. With reference to the Figure, a CPU 1, a RAM 2 and a ROM 3 mutually exchange data through a data bus line 4. I/O ports 11 through 14 are connected to a PLA10 which processes the I/O signals from those I/O ports in accordance with a given program. I/O ports 21 through 23 are directly connected to the data bus line 4. An interrupt processing circuit 40 is controlled by the output of the PLA10. A timer 32 is connected to the interrupt processing circuit 40 to control its timing. A frequency divider 31 divides the frequency of the standard clockpulses. A modulation circuit 30 combines the outputs of the frequency divider 31. With the above mentioned construction, all the input terminals 12.0 through 12.7, 13.0 through 13.7 and 14.0 through 14.7 derived from the I/O ports 12 through 14 may be used as interrupt terminals, or a few of the input terminals may be used as interrupt terminals with the other input terminals being used as ordinary input terminals for the I/O ports. Terminals 11.0 through 11.7 are used to output therefrom the output signals from the I/O port 11 which is given a construction different from the other I/O ports 12 through 14 as will be described later. For example, the I/O port 11 is constructed to have logic circuits for the signals input from the terminals 12.0 through 12.7. With this construction, outputs can be derived from the terminals 11.0 through 11.7 independently of the program of the microcomputer. In other words, output signals can be derived while the microcomputer is in non-operating condition, e.g. at a reset condition or waiting condition.

Figure 2:
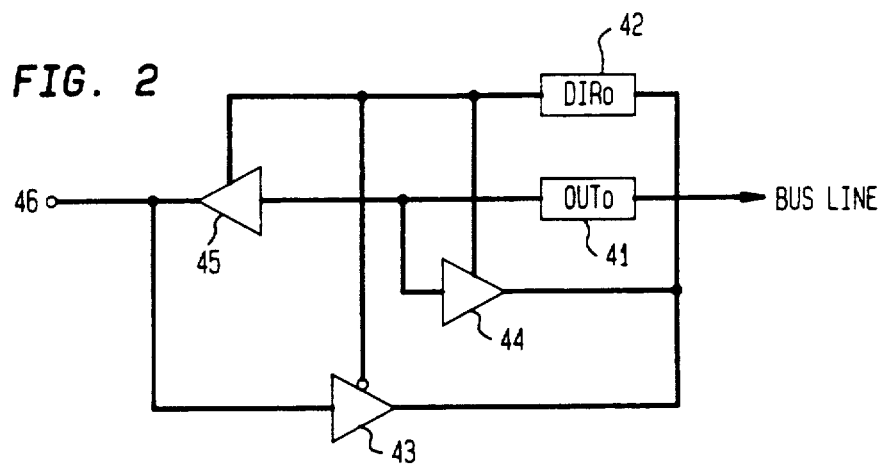
FIG. 2 is a circuit diagram showing an exemplary definite construction of the I/O ports 21 through 23 in FIG. 1.

FIG. 2 shows the circuit construction of the I/O ports 21 through 23. The construction is the same as that of a conventional I/O port and is formed with tri-state buffers 43, 44 and 45 and latch circuits and 41 and 42. The input terminal of the latch circuit 41 and the input terminal of the latch circuit 42 are connected with the bus line 4 which is within the microcomputer. The latch circuit 42 is for indicating the direction of signals. The port 46 is in input mode when the content DIR0 of the latch circuit 42 is a logic "0", while the port 46 is in output mode when the content DIR0 of latch circuit 42 is a logic "1". In the output mode, the signal on the data bus line 4 is latched in the latch circuit 41 in accordance with an output instruction of the program. The latched signal is output to the port 46 through the buffer 45. In the input mode, the signal which is input to the port 46, is transmitted to the data bus line 4 through the buffer 43 and is captured by an accumulator in the microcomputer. The buffer 44 is a gate which is unblocked when the content of the latch 41 is determined. When the instruction of reading the content of the port 46 is executed in the output mode, the output terminal of the latch circuit 41 is connected to the bus line 4 through the gate B2.

Figure 3:
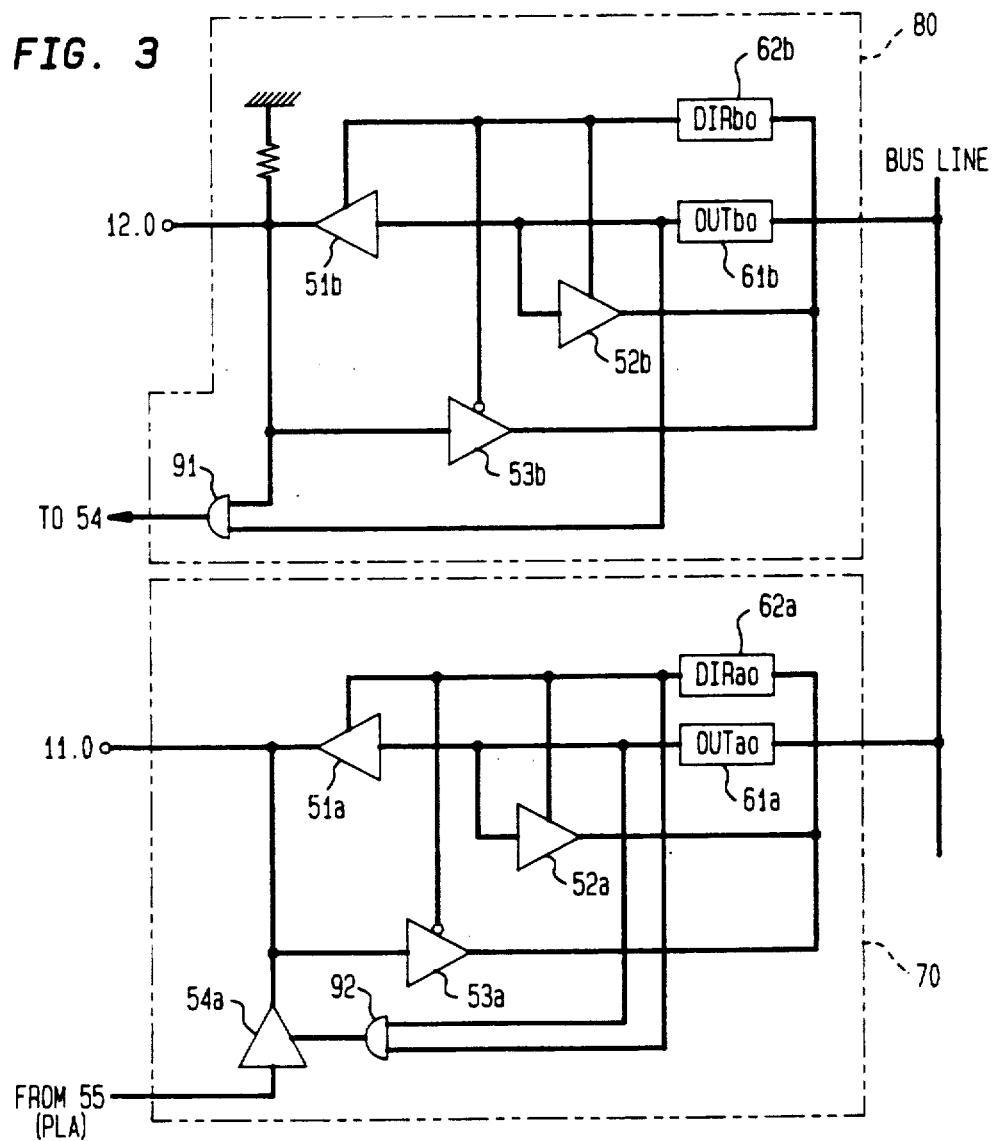
FIG. 3 is a circuit diagram showing an exemplary definite construction of the I/O ports 11 through 14 in FIG. 1.

FIG. 3 shows an exemplary definite construction of the I/O ports 11 through 14 in FIG. 1. In the Figure, I/O terminals of each one bit are shown for the convenience of explanation. The elements indicated by reference characters 51a, 51b, 52a, 52b, 53a and 53b and 61a, 61b, 62a and 62b correspond to the buffer 45, 44 and 43 and the latch circuit 41 and 42 in FIG. 2, respectively. The portion 70 surrounded by a chain-dot line is an I/O port which outputs signals from the PLA10 to the port terminal 11.0. The portion 80 is an I/O port which outputs signals from the port terminal 12.0 to the PLA. In the portion 80, a buffer 51b is for an output latch circuit 61b. Buffers 52b and 53b are activated in accordance with the state of the direction instructing latch circuit 62b.

AND gate 91 is enabled to transmit the signal at the port terminal 12.0 to the PLA10 through the terminal 54 in accordance with the content of the latch circuit 61b. In the portion 70, a buffer 54a transmits the outputs 55 of the PLA10 to the port Pa0 and is unblocked by the output of AND gate 92 when both outputs of the latch circuits 62a and 61a are respectively "0". In other words, the signal input to the terminal 55 is output at the port 11.0 when the direction instructing latch circuit 62a is in the input mode and the content of the output latch 61a is 0. The following table 1 shows the relationship between the states of the latch circuits 61a and 62a and the output and input signals.

TABLE 1

| 62a | 1 | 1 | 0 | 0 |
|---|---|---|---|---|
| 61a | 0 | 1 | 0 | 1 |
| Output of Pa0 | 0 (61a) | 1 (61a) | 55 | — |
| Input to the bus line | same as above | same as above | 11.0 (55) | 11.0 |

Figure 4:
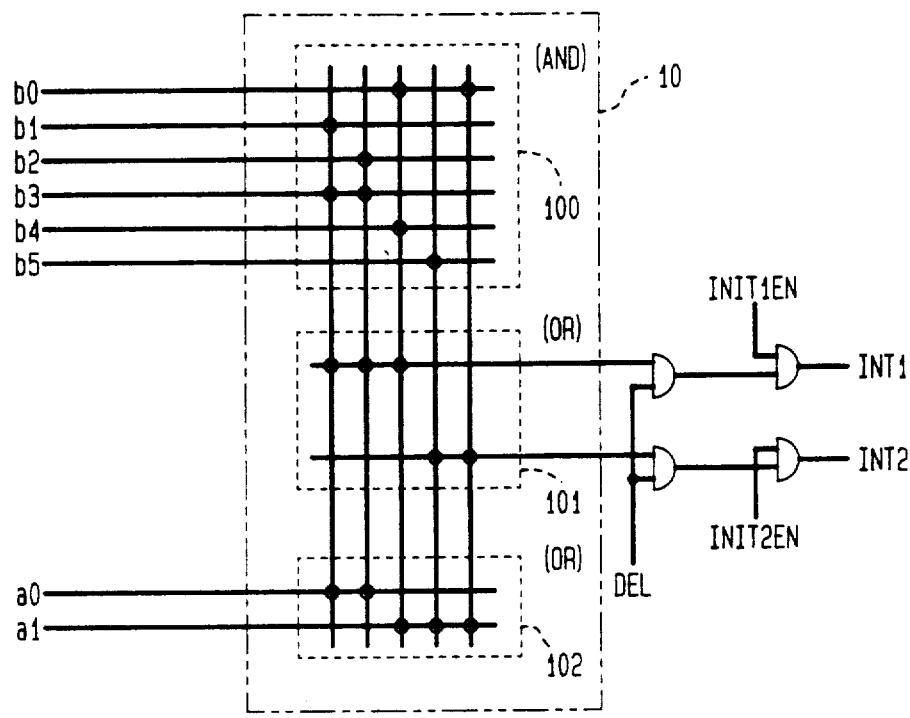
FIG. 4 is a circuit diagram showing an exemplary definite circuit construction within the PLA.

FIG. 4 shows an example of the internal circuit construction of the PLA10. In FIG. 4, b0 through b5 represent input signals from the I/O ports in the portion 80 in FIG. 3 (I/O port 12 in FIG. 1). Reference characters a0 and a1 represent the output signals to the I/O port in the portion 70 in FIG. 3 (the I/O port 11 in FIG. 1). Although six lines are shown to be derived from the portion 80 and two lines are shown to be connected with the portion 70 for the convenience of explanation, the input terminals 12.0 through 12.7, 13.0 through 13.7 and 14.0 through 14.7 have the construction of the portion B and the input terminals 11.0 through 11.7 have the construction of the portion 70. The input signals b0 through b5 are processed by the logic in the PLA10 network in an AND block 100 the outputs of which output are processed by the logic network in an OR block 101 to be output as interrupt signals INT1 and INT2. The outputs of the AND block 100 are also processed by the logic network in an OR block 102 to produce outputs a0 and a1. The interrupt signals INT1 and INT2 are processed by the interrupt processing circuit 40 in FIG. 1 such that the rising edges of the signals give interruption to the microcomputer. The delay signal DEL for delaying the activation of the microcomputer is activated from its waiting condition after the power supply is stabilized. Signals INT1EN and INT2EN can be controlled by the program of the microcomputer.

In the embodiment of FIG. 4, the signals for the PLA10 are as follows.

$$INT1 = b1 \cdot b3 + b2 \cdot b3 + b0 \cdot b4$$

$$INT2 = b0 + b5$$

In the following, the inhibition of interruption at the portion 80 in each terminal is taken into consideration. Assume that signals from manually operated switches are input to the terminals 12.1 and 12.2 and signals from switches operated by the mechanism within the device controlled by the microcomputer of the present embodiment are input to the terminals 12.0, 12.4 and 12.5. Further assume the latches assume the following states at a waiting condition of the microcomputer:

| INT1EN | 1 |
|---|---|
| INT2EN | 0 |
| 61b of 12.0 | 0 |
| 61b of 12.1 | 1 |
| 61b of 12.2 | 1 |
| 61b of 12.3 | 1 |
| 61b of 12.4 | 0 |
| 61b of 12.5 | 0 |
| 62b of 12.0–12.5 | 0 | the signals INT1 and INT2 will then be:

$$INT1 = b1 \cdot b3 + b2 \cdot b3$$

$$INT2 = \text{inhibited}$$

Thus, when 12.3=0, the microcomputer will be in a waiting condition because INT1=0. When a manually operated switch is operated and the signal at the input terminal 12.1 or 12.2 becomes "1" with 12.3 being 1, the microcomputer is activated. In other words, the terminal 12.3 may be connected to a main switch of the device.

When the contents of latch circuits 61b of 12.1 through 12.3 are made 0 and the contents of latch circuits 61b of 12.0, 12.4 and 12.5 and the interrupt signal INT2EN are made 1 in accordance with the program of the microcomputer after its activation, the following are attained:

$$INT1 = b0 \cdot b4$$

$$INT2 = b0 + b5$$

Thus, the interrupt can be used with much flexibility controlling the latching of each output from the portion 80 by the program of the microcomputer and through providing the construction of a PLA10 in the form that allows that purpose.

At the above mentioned waiting condition, the OR block 102 gives following condition:

$$a0 = b1 \cdot b3 + b2 \cdot b3$$

$$(61a = 62a = 0)$$

This provides the same logic as that of the interrupt signal INT1 and may be used for following application.

Figure 5:
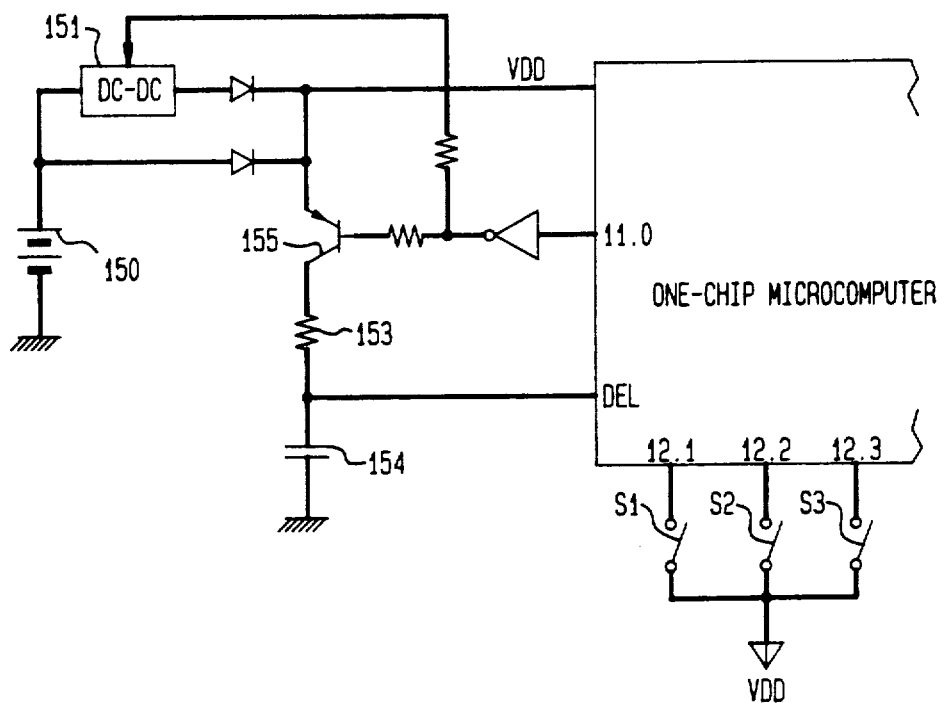
FIG. 5 is a circuit diagram showing an exemplary application of the embodiment of the present invention.

FIG. 5 shows an example wherein the microcomputer according to the embodiment of the present invention is used with a power source which is provided with a voltage booster circuit The output of 3V of a power source battery 150 is boosted to 5V by a voltage booster circuit composed of a DC-DC converter 151. Each one-side terminal of a main switch S3 and initiation switches S1 and S2 are connected to the output terminal VDD of the voltage booster circuit. The other side terminals for the switches are respectively connected with input terminals 12.1, 12.2 and 12.3. A resistor 153 and a capacitor 153 together form a delay circuit. At the waiting condition, the microcomputer is supplied with a voltage of 3V from the power source battery 150. When the initiation switch S1 or S2 is turned on with the main switch S3 is ON, the signal a0 will be 1 as described above to initiate boosting operation of the voltage booster circuit 151 and a transistor 155 becomes conductive. However, it takes some time until the booster circuit 151 reaches a stable state. If the microcomputer starts its operation before the stabilization of the booster circuit, the microcomputer performs a malfunction. To prevent this, after lapse of a delay time due to the resistor 153 and the capacitor 154 which time ensures the output voltage to become stable, the signal DEL becomes 1 so that the interruption shown in the FIG. 4 works to activate the microcomputer.

Figure 6:
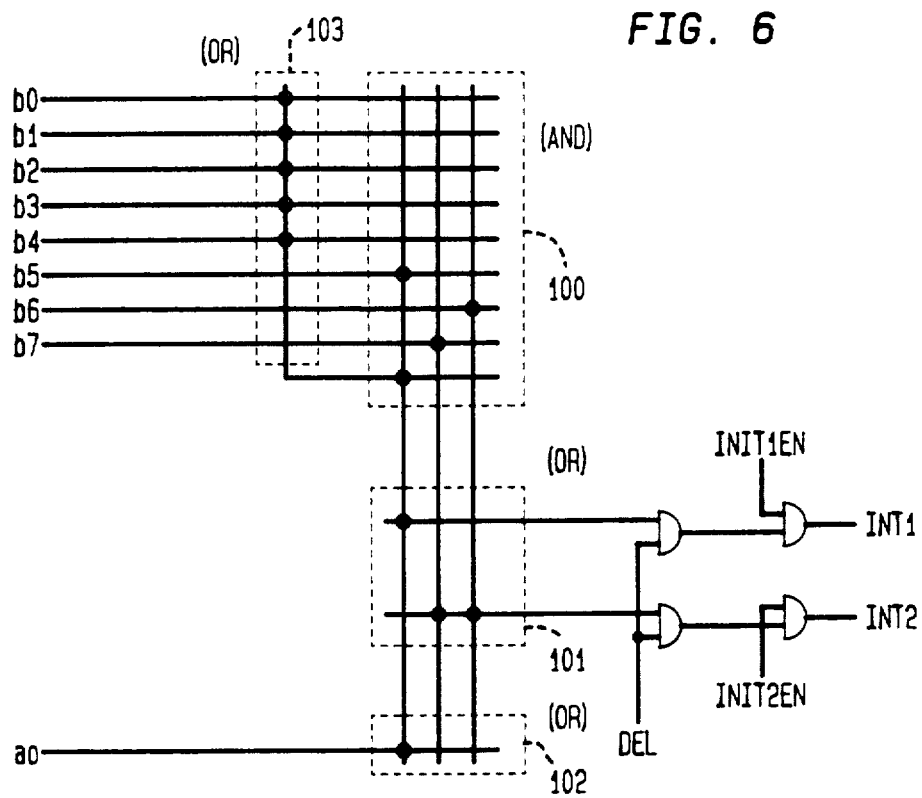
FIG. 6 is a circuit diagram showing a modification of the circuit shown in FIG. 4.

FIG. 6 shows a modification of the circuit shown in FIG. 4. In the circuit of FIG. 6, another OR block 103 is added in view of the fact that the interrupt operation for activation of a microcomputer generally works in many cases in accordance with an OR logic of signals applied to input terminals. With this construction, the number of crossing points are significantly reduced to lessen the area of the chip of the microcomputer in comparison with the case wherein only the AND block 100 and OR blocks 101 and 102 are provided.

Figure 7:
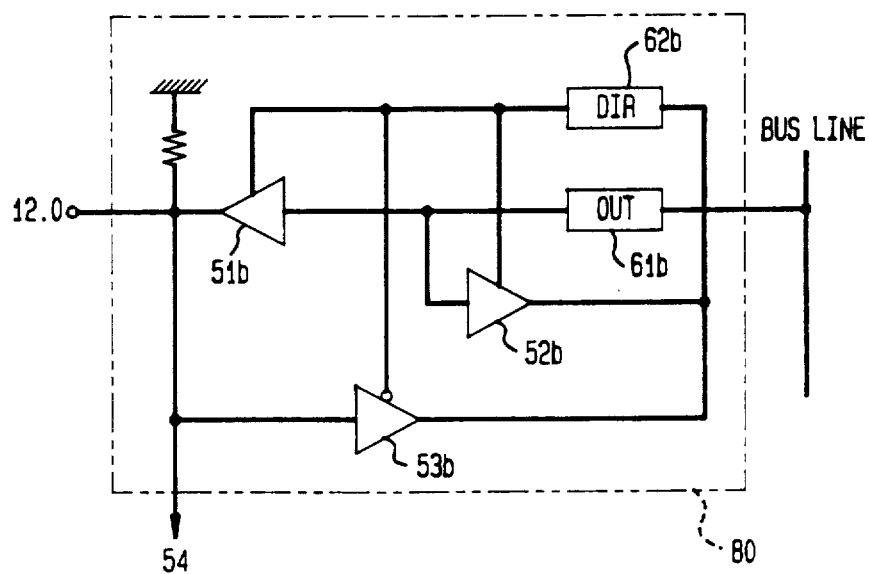
FIGS. 7 and 8 are circuit diagrams showing other modifications.
Figure 8:
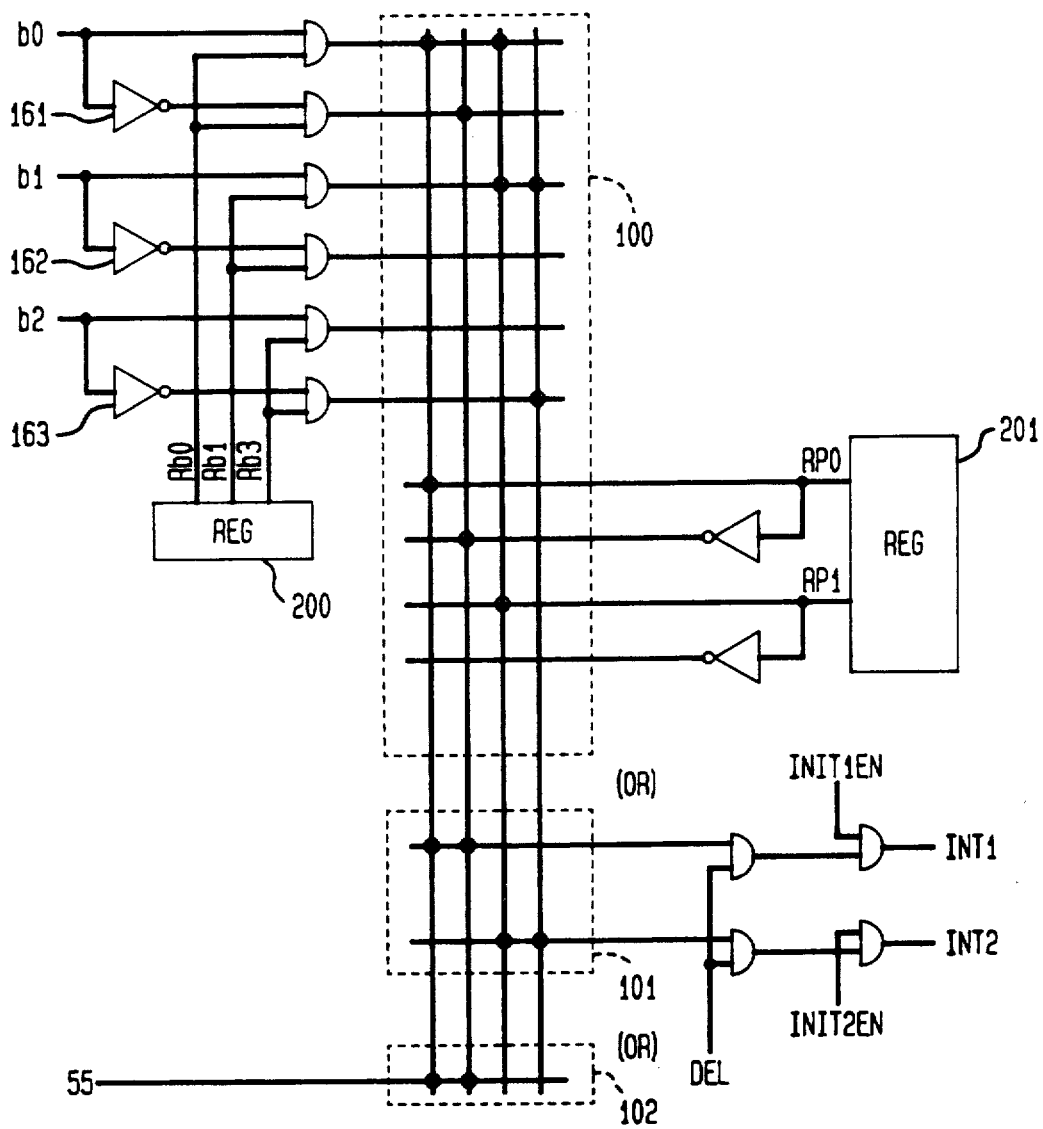

FIGS. 7 and 8 show further modifications wherein the polarity for the interruption is specified at each terminal. The circuit of FIG. 7 is formed with the AND gate 91 being removed from the circuit of FIG. 3 such that the port 12.0 is used as the terminal to input signal b0 to the PLA10. In FIG. 8, a register 200 is for the control of interruption, while another register 201 is for specifying the polarity. Both registers 200 and 201 can be re-written. If the register 200 is neglected, the logic of the PLA10 will be $$INT1 = b0 \cdot Rp0 + \overline{b0} \cdot \overline{Rp0}$$

$$INT2 = b0 \cdot b1 \cdot Rp1 + b1 \cdot \overline{b2}$$

Hence, the interrupt signal INT1 can be determined to specify the interruption at the rising or dropping of the signal by the content of the output Rp0 of the register 201. The outputs of the inverters 161 through 163 may be input to the PLA10 to enable the interruption in response to the dropping of the signal applied to the terminal 12.2.

Figure 9:
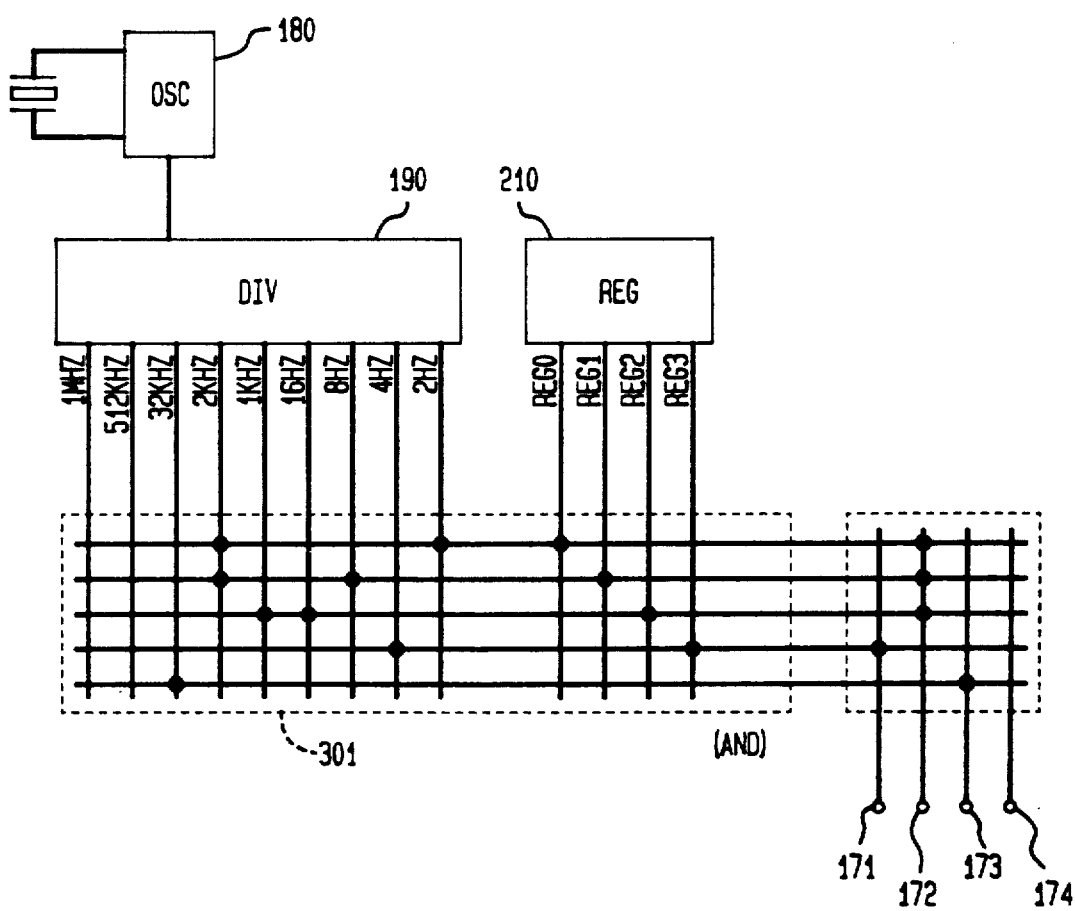
FIG. 9 is a circuit diagram showing definite examples of the modulation circuit and the frequency dividing circuit in FIG. 1.

FIG. 9 shows definite example of the modulation circuit 30 and the frequency divider circuit 31 in FIG. 1. In the case a microcomputer controls the sound generation of a buzzer or the blink of an LED, the microcomputer is occupied for the control of the buzzer or LED and can not perform other process if the power is intermittently supplied to the buzzer or LED by the microcomputer program. Accordingly, it was proposed that the output of an oscillator 180 is directly output to an outer element. In the circuit of FIG. 9, a PLA10 is also used to do the same thing but in more functional manner. The circuit of FIG. 9 produces following signals:

| | |
|---|---|
| 171 = | 4 Hz · RG3 |
| 172 = | 2 kHz · 2 Hz · RG0 + |
| | 2 kHz · 8 Hz · RG1 + |
| | 1 kHz · 16 Hz · RG2 |
| 173 = | 32 kHz |

Hence, the setting of register 210 inhibits or selects the outputs at the terminals 171 through 173 and modulated outputs can be made by obtaining logic AND outputs of the divided frequencies divided by divider 190. If a buzzer is connected to the terminal 172, the frequency of intermittent driving and tone of the buzzer can be changed in accordance with the outputs RG0, RG1, and RG2 of the register 210.

According to the above embodiments, following advantages are expected:

1) The number of the interrupt terminals can be increased and reduced by specifying the PLA upon ordering the program to the microcomputer manufacturer.
2) As the I/O terminals are allotted to the interrupt terminals, those I/O terminals may be used as ordinary I/O terminals when it is not necessary to increase the interrupt terminals.
3) Each interrupt terminal may be masked separately.
4) The polarity may be specified for each interrupt terminal.

As many apparently widely different embodiments of this invention may be made without departing from the spirit and scope herein, it is to be understood that the invention is not limited to the specific embodiments thereof except as defined in the appended claims.

What is claimed is:

1. A one-chip microcomputer comprising:
   a data bus;
   a central processing unit;
   I/O means for selectively inputting data to and outputting data from said microcomputer, and for selectively operating as an interrupt terminal in accordance with instructions received from said central processing unit over said data bus;

a programmable logic array, connected to an output of said I/O means, for processing data received from said I/O means in accordance with a program programmed in said programmable logic array, and for outputting a signal to at least one output terminal thereof when said data received from the I/O means matches predetermined data programmed in said programmable logic array; and interrupt means for performing an interrupt operation of said microcomputer in response to said signal output from said programmable logic array.

2. A one-chip microcomputer according to claim 1, further comprising a register, connected to said I/O means, for storing data, said stored data for controlling selective transmission of data from said I/O means to said programmable logic array.

3. A one-chip microcomputer comprising:
I/O means for selectively inputting first data to and outputting data from said microcomputer, and being capable of acting as an interrupt terminal;

a register for storing second data specifying generation of an interrupt signal with respect to the polarity of one bit of data input to said I/O means;

a programmable logic array, connected to said I/O means and said register, for processing said first data input from said I/O means in accordance with a program programmed in said programmable logic array and said second data from said register, and for outputting a signal to at least one output terminal thereof when said programmable logic array determines that the polarity of said one bit of said first data input to I/O means coincides with the polarity specified by said second data and said first data received from the I/O means matches predetermines data programmed in said programmable logic array, wherein polarity refers to the leading or trailing edge of a signal pulse; and interrupt means for performing an interrupt operation of said microcomputer in response to said signal output from said programmable logic array.

4. A one-chip microcomputer according to claim 3, further comprising an interrupt control register, connected between said I/O means and said programmable logic array, for storing third data for control of the interrupt operation.

5. A one-chip microcomputer comprising:
I/O means for selectively inputting data comprising a plurality of bits, for outputting data, and being capable of acting as an interrupt terminal;

a programmable logic array, connected to said I/O means, for processing said input data received from said I/O means in accordance with a program programmed in said programmable logic array, wherein said logic array includes an AND logic network which receives said input data from said I/O means and outputs a logic product of said input data from said I/O means, said output of said AND logic network being input to a first OR logic network which outputs of logic sum of the data output from said AND logic network, said programmable logic array being constructed to produce an interrupt signal when said input data matches a predetermined data programmed in said first OR network and said AND network; and an interrupt means for performing an interrupt operation of the microcomputer in response to the output of said OR network of said programmable logic array.

6. A one-chip microcomputer comprising:
I/O means for selectively inputting data comprising a plurality of bits to said microcomputer, and for outputting data from said microcomputer;

a programmable logic array, connected to said I/O means and having at least one output terminal, for processing the input data received from I/O means and for outputting to said at least one output terminal of the programmable logic array a signal when the input data matches a predetermined data programmed in said programmable logic array; and an output terminal means for outputting the signal to the outside of said one-chip microcomputer independently of a program stored in said microcomputer.

* * * * *